United States Patent Office 2,900,394
Patented Aug. 18, 1959

2,900,394

PREPARATION OF TETRACHLOROTHIOPHENE

Emil J. Geering, Grand Island, N.Y., assignor to Hooker Chemical Corporation, Niagara Falls, N.Y., a corporation of New York No Drawing. Application December 13, 1957
Serial No. 702,548

5 Claims. (Cl. 260—332.5)

This invention relates to a process for the preparation of tetrachlorothiophene.

The present invention resides in the preparation of tetrachlorothiophene without the use of thiophene as a basic starting material. The various processes heretofore used in the preparation of tetrachlorothiophene have been economically undesirable principally because of the high cost of the thiophene starting material. The process of this invention provides an economical route to the production of tetrachlorothiophene, in a manner not logically predictable from the established observations of the art. The invention more specifically is the conversion of hexachlorobutadiene by reaction with sulfur to tetrachlorothiophene. It is important to the invention that the reaction be carried out in the liquid phase.

Tetrachlorothiophene is known to have pesticidal properties. It is quite desirable for instance as a fungicide, insecticide, nematocide or germicide. Its widespread commercial use as such, however, has heretofore been precluded by its high cost of preparation. To warrant the use of a compound as a pesticide, in addition to being active as such, it should be among other things economical. The cost of production of a pesticide must be commensurate with its activity. Unsuccessful attempts have been made to produce thiophene at a low cost but presently this compound is priced in a range untenable for a pesticide basic production material. It is a primary object of this invention to provide an economical method for the production of tetrachlorothiophene.

It is generally understood that hexachlorobutadiene is unreactive. It is reported in the literature that hexachlorobutadiene does not add chlorine, that it does not react with maleic anhydride, that is does not polymerize (even at 100 atmospheres) and that it is stable toward alkalies and acids. It was, therefore, surprising to observe that sulfur and hexachlorobutadiene react to give tetrachlorothiophene in essentially quantitative yields. It is, therefore, another object of this invention to provide a novel method for the preparation of tetrachlorothiophene. It is a further object of this invention to provide a method for the preparation of tetrachlorothiophene without using expensive thiophene as a starting material and yet resulting in a near quantitative yield of tetrachlorothiophene.

Many economical pesticides are currently being marketed, and the particular value of any of them is a function of its degree of activity versus its price. The high cost of the production of tetrachlorothiophene has been due to the high cost of the basic starting material thiophene. Tetrachlorothiophene, therefore, would not compete cost-wise with the other products on the market for the same purpose. It is a still further object of this invention to provide a process for the manufacture of tetrachlorothiophene which will allow it to become economically competitive with like products in the commercial world.

My invention is the conversion of hexachlorobutadiene by reaction with sulfur to tertrachlorothiophene. Chlorine is removed from the diene and is evolved as sulfur monochloride in the following manner:

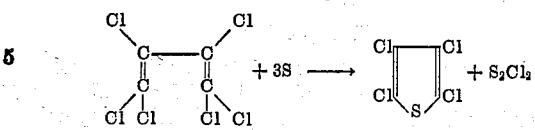

It is there therefore, a still further object of this invention to provide a process whereby tetrachlorothiophene and sulfur monochloride are produced simultaneously and in near quantitative yield.

Other objects will become apparent upon a further reading of the following disclosure.

The process comprises heating a solution of sulfur and hexachlorobutadiene at a temperature between 100 degrees centigrade and the decomposition temperature of hexachlorobutadiene with concurrent distillation of sulfur chloride for about at least five hours. In preparing the solution of sulfur in hexachlorobutadiene the dissolution of sulfur is facilitated by heating the hexachlorobutadiene before adding the sulfur. The addition of sulfur, which may be either in a solid or molten state, to the hexachlorobutadiene may be continued during the course of the reaction. It is important that all of the sulfur eventually be in solution and thereby be available for reaction and also to avoid residue problems. The preferred reaction temperature is 205 degrees centigrade to 240 degrees centigrade. For best results an excess of hexachlorobutadiene should be used, however, it would not deviate from the spirit of this invention not to use such an excess, an excess of hexachlorobutadiene being an amount greater than that specified in the forementioned equation. There are several methods of product isolation, and the choice of these is dependent on the purity of product desired. For instance, the $S_2Cl_2$-distillation residue may be taken as product, the tetrachlorothiophene may be isolated in higher purity by distillation directly from the reaction vessel, or for a product of still higher purity, the tetrachlorothiophene may be isolated by distillation directly from the reaction vessel followed by fractionation of the product. This invention is not only a process for the preparation of tetrachlorothiophene, but is useful also as mentioned earlier, for the concurrent preparation of $S_2Cl_2$, which is valuable as a reagent for introducing sulfur into certain organic compounds, e.g., a reagent necessary for the manufacture of certain lubricant additives.

It is necessary for satisfactory results and it is important to this invention that the reaction be carried out in the liquid phase. Thus only when a solution of hexachlorobutadiene and sulfur is heated is a substantially quantitative yield of tetrachlorothiophene obtained. As a method of avoiding heat transfer and residue problems and of insuring that sufficient hexachlorobutadiene to react with the remaining sulfur will be present in the reaction vessel towards the end of the period of $S_2Cl_2$ formation, it is advantageous to use an excess of hexachlorobutadiene.

In this process a solution of hexachlorobutadiene is heated and the $S_2Cl_2$ removed by distillation as it forms. The reaction time is dependent upon such conditions as the mode of dissolution of the sulfur, the concentration of the sulfur and hexachlorobutadiene solution, the reaction temperature, the rate of removal of $S_2Cl_2$ and other conditions.

Hexachlorobutadiene as contrasted with thiophene, is available in commercial quantities at a low price, and can be produced economically from the readily available butane and chlorobutane. Presently, thiophene is priced in a range wholly untenable for a pesticide basic production material. The reaction in liquid phase of hexachlorobutadiene with sulfur produces an essentially quantitative yield of tetrachlorothiophene, as well as sulfur monochloride quite unexpectedly and unpredictably. A reaction carried out in the vapor phase did not give satisfactory results and resulted in a decidedly lower yield than did the reaction carried out in the liquid phase.

This invention may be better illustrated by reference to the following examples:

Example I

In this example, 1 part is equal to 1 mole. A solution of 45 parts of hexachlorobutadiene-1,3 and 45 parts of sulfur was heated at reflux under a fractionating column. As sulfur monochloride formed, it was removed at the top of the column. During 13 hours, 14.4 parts of sulfur monochloride was distilled off. The system was then put under 7-8 mm. of vacuum, the excess hexachlorobutadiene removed at 82–83 degrees centigrade, and finally, after an intermediate cut, tetrachlorothiophene was taken off at 91–94 degrees centigrade. The total weight of the sulfur monochloride, hexachlorobutadiene and tetrachlorothiophene that was distilled represented 98.4 percent of the weight of the original charge. As shown by comparison of the infrared spectra of the distillates with the spectrum of a sample of tetrachlorothiophene of known purity, the yield of tetrachlorothiophene was 14.8 parts or 99 percent of the theoretical amount.

The distillation cut in this example, which contained the greatest percentage of tetrachlorothiophene held 12.2 parts of tetrachlorothiophene. This distillate melted at 27–29 degrees centigrade, and contained 14.4 percent sulfur and 63.7 percent chlorine. The melting points reported in the literature for tetrachlorothiophene range from 20 to 36 degrees centigrade. The calculated analysis for $C_4Cl_4S$ is: Cl, 63.9; S, 14.4.

Example II

The apparatus consisted of a 40" x 1½" distillation column packed with ⅛" glass helices, equipped with an automatic take-off and mounted on a 12–1 pot.

Sulfur, 111.15 parts, was dissolved, in three equal portions, in 40.85 parts of hexachlorobutadiene heated at 100 degrees centigrade–150 degrees centigrade. The dissolution of the sulfur was aided by the use of a mechanical stirrer which was removed after each charge. After each charge of sulfur the solution was refluxed under a fractionation column with concurrent sulfur monochloride distillation for ten to twenty hours (reflux ratio 1:4). The total reaction time was about fifty hours. The product and the excess hexachlorobutadiene was then distilled (at 1:1 ratio) without fractionation, from traces of sulfur and a small sulfur-containing residue. The distillate was then carefully fractionally distilled. The tetrachlorothiophene present in the fractionated material was 34.9 parts of 94 percent of theory. The quantity of tetrachlorothiophene of greater than 99.5 percent purity that was collected was 26.5 parts.

A substantially larger quantity of tetrachlorothiophene can be prepared in one run and in the same size vessel by this procedure as can be made by the procedure described in Example I. A second advantage of this method over Example I is that the possibility of sulfur chloride contamination of the product due to the reaction of traces of sulfur or sulfur-containing side products with hexachlorobutadiene during the distillation of tetrachlorothiophene is eliminated.

Example III

The apparatus consisted of a 24" x ⅞" distillation column packed with ⅛" glass helices, and mounted on a three liter three-necked flask. The pot was charged with 2390 grams (9.17 moles) of hexachlorobutadiene. The sulfur 800 gms. (25 moles) was added in the molten state to the boiling hexachlorobutadiene (210–220 degrees centigrade) over a period of two hours via a dropping funnel which had been wound with heating tape. During the next seven hours 1088 gms. of $S_2Cl_2$ was removed at the top of the column from the refluxing reaction mixture. The residue was then distilled to give 1938 gms. of distillate. By infrared analysis this material was shown to contain 1530 gms. of tetrachlorothiophene. Reaction time was about 7–9 hours.

It is important in the examples of this invention, as above shown that the sulfur be completely dissolved in order to prevent caking which would result in excessive tar formation. This is accomplished by adding the sulfur in portions during the reaction. The purity of the tetrachlorothiophene obtained as illustrated in these examples is dependent on the efficiency of the fractionating column.

It is not intended that the above examples be restrictive as to scope, conditions or modifications of the process. Recycling hexachlorobutadiene containing tetrachlorothiophene, using solvents, e.g., tetrachlorothiophene and varying reaction temperature, pressure, or time are illustrative of refinements that are readily apparent to persons familiar with chemical practices. Although I have described the limitations of my invention, similar modifications and variations will suggest themselves to persons skilled in the art upon reading this disclosure. These are intended to be comprehended within the spirit of this invention.

I claim:

1. A process for the preparation of tetrachlorothiophene which comprises heating up to the decomposition temperature of hexachlorobutadiene, sulfur with hexachlorobutadiene.

2. A process for the preparation of tetrachlorothiophene which comprises reacting in the liquid phase sulfur with a stoichiometric excess of hexachlorobutadiene, and upon heating the resulting solution at reflux, distilling off sulfur monochloride as it forms.

3. A process for the preparation of tetrachlorothiophene which comprises completely dissolving sulfur in excess hexachlorobutadiene, heating the resulting solution to reflux, distilling off sulfur monochloride as it forms, and upon complete distillation of sulfur monochloride distilling off excess hexachlorobutadiene and finally distilling off tetrachlorothiophene.

4. A process for the preparation of tetrachlorothiophene and sulfur monochloride and which comprises adding sulfur in small portions to a stoichiometric excess of hexachlorobutadiene continuously while heating said excess of hexachlorobutadiene, thereby completely dissolving the sulfur, heating the resulting solution to reflux after each sulfur addition, distilling off sulfur monochloride until the residue is substantially completely free of sulfur monochloride, distilling off a mixture comprising tetrachlorothiophene and excess hexachlorobutadiene, and separating tetrachlorothiophene and excess hexachlorobutadiene by fractionation.

5. A process for the preparation of tetrachlorothiophene which comprises heating hexachlorobutadiene, adding sulfur to said hexachlorobutadiene in a continuous manner so as to insure complete dissolving of said sulfur, refluxing said reaction mixture at a temperature of about 205 to 240 degrees centigrade with concurrent distillation of sulfur monochloride for about 7 to 50 hours, distilling off a tetrachlorothiophene-hexachlorobutadiene mixture, and separating tetrachlorothiophene from the hexachlorobutadiene by fractionation.

References Cited in the file of this patent

UNITED STATES PATENTS 2,410,401     Coffman  ---------------- Oct. 29, 1946

UNITED STATES PATENT OFFICE

CERTIFICATE OF CORRECTION

Patent No. 2,900,394                 August 18, 1959

Emil J. Geering

It is hereby certified that error appears in the printed specification of the above numbered patent requiring correction and that the said Letters Patent should read as corrected below.

Column 1, line 47, for "that is" read -- that it --; line 60, for "any of them" read -- any one of them --; line 72, for "tertrachlorothiophene" read -- tetrachlorothiophene --; column 3, line 32, for "from 20 to 36" read -- from 29 to 36 --.

Signed and sealed this 19th day of July 1960.

(SEAL)
Attest:

KARL H. AXLINE                           ROBERT C. WATSON
Attesting Officer                      Commissioner of Patents